United States Patent
Lange (10) Patent No.: US 7,059,799 B1
(45) Date of Patent: *Jun. 13, 2006

(54) METHOD AND DEVICE FOR REDUCING CONSTRUCTION SITE TRACK OUT

(76) Inventor: Jeffrey M. Lange, 500 E. Vera La., Tempe, AZ (US) 85284

( * ) Notice: Subject to any disclaimer, the term of this patent is extended or adjusted under 35 U.S.C. 154(b) by 0 days.

This patent is subject to a terminal disclaimer.

(21) Appl. No.: 11/286,073

(22) Filed: Nov. 23, 2005

Related U.S. Application Data (63) Continuation of application No. 11/024,558, filed on Dec. 28, 2004, now Pat. No. 6,981,818, which is a continuation-in-part of application No. 10/211,664, filed on Aug. 2, 2002, now Pat. No. 6,881,006.

(51) Int. Cl.
 *E01B 23/00* (2006.01)
(52) U.S. Cl. ............................ 404/15; 134/123; 238/14
(58) Field of Classification Search ................. 404/15, 404/19, 34, 35, 36; 238/10, 14; 134/123; D25/117
See application file for complete search history.

(56) References Cited

U.S. PATENT DOCUMENTS

| | | | | |
|---|---|---|---|---|
| 1,389,400 | A | * | 8/1921 | Tufts ........................... 238/14 |
| 1,574,729 | A | | 2/1926 | Foster |
| 1,614,213 | A | * | 1/1927 | Smith ......................... 134/123 |
| 1,720,461 | A | | 7/1929 | Barrett |
| 1,815,435 | A | * | 7/1931 | Harding et al. ............... 238/14 |
| 2,367,917 | A | * | 1/1945 | Arthur ........................ 182/163 |
| 2,382,789 | A | | 8/1945 | Guignon, Jr. |
| 2,402,090 | A | | 6/1946 | Ruppel |
| 2,619,289 | A | * | 11/1952 | Plante .......................... 238/14 |
| 2,819,026 | A | | 1/1958 | Leyendecker |
| 2,912,909 | A | | 11/1959 | Hart |
| 3,069,090 | A | * | 12/1962 | Ginsberg ...................... 238/14 |
| 3,997,110 | A | * | 12/1976 | Aumont ........................ 238/14 |
| 4,265,399 | A | * | 5/1981 | Covington .................... 238/14 |
| 4,276,728 | A | | 7/1981 | Balzer et al. |
| 4,462,712 | A | | 7/1984 | Penland, Sr. |
| 4,600,336 | A | | 7/1986 | Waller, Jr. |
| 4,650,115 | A | | 3/1987 | Fontaine |
| 4,875,800 | A | | 10/1989 | Hicks |
| 4,889,444 | A | | 12/1989 | Pouyer |
| 4,917,125 | A | | 4/1990 | Midkiff |
| 4,979,536 | A | | 12/1990 | Midkiff |
| 5,020,937 | A | | 6/1991 | Pouyer |
| 5,087,149 | A | | 2/1992 | Waller, Jr. |
| 5,106,226 | A | * | 4/1992 | Fanslow et al. ............... 404/15 |

(Continued)

*Primary Examiner*—Gary S. Hartmann
(74) *Attorney, Agent, or Firm*—Schmeiser, Olsen & Watts LLP (57) ABSTRACT

A method for shaking vehicles comprises driving them over a series of appropriately spaced-apart, mutually parallel bars to vigorously shake the wheels, undercarriage, and body to free them of dirt, gravel and debris. An apparatus may have bars with the appropriate spacing. A track may include a frame and the spaced-apart bars may form part of the frame. The track may be large enough to accommodate all the wheels of a vehicle at once. Alternatively, smaller tracks may be flexibly connected end-to-end to form a shaker that will receive right and left hand wheels of the vehicle on respective rows. The shaker may be deployed onto a bed of aggregate that is sufficiently coarse to allow the fallen dirt to sift or be washed through the bed of aggregate. The aggregate may also assist in holding the shaker in place and may provide ramps at the ends of the shaker.

1 Claim, 5 Drawing Sheets

U.S. PATENT DOCUMENTS

| | | |
|---|---|---|
| 5,163,776 A | 11/1992 | Pouyer |
| 5,261,433 A | 11/1993 | Smith |
| 5,383,742 A | 1/1995 | Grace |
| 5,730,164 A | 3/1998 | Midkiff et al. |
| 5,820,294 A | 10/1998 | Baranowski |
| 6,358,330 B1 | 3/2002 | McGraw |
| 6,520,420 B1 * | 2/2003 | Singh .......................... 238/14 |
| 6,561,201 B1 | 5/2003 | Midkiff |
| 6,568,411 B1 | 5/2003 | Staples et al. |
| 6,881,006 B1 * | 4/2005 | Lange .......................... 404/15 |

* cited by examiner

METHOD AND DEVICE FOR REDUCING CONSTRUCTION SITE TRACK OUT

This application is a continuation of U.S. patent application Ser. No. 11/024,558, filed on Dec. 28, 2004, now U.S. Pat. No. 6,981,818 entitled "METHOD AND DEVICE FOR REDUCING CONSTRUCTION SITE TRACK OUT", which is a continuation-in-part of U.S. patent application Ser. No. 10/211,664, filed Aug. 2, 2002, now U.S. Pat. No. 6,881,006 and entitled DEVICE AND METHOD FOR REDUCING CONSTRUCTION SITE TRACK OUT, the disclosures of which are incorporated herein by reference.

BACKGROUND OF THE INVENTION

1. Technical Field

This invention relates generally to a product and method for removing dirt from construction vehicles before they leave the construction site. More specifically, this invention uses vibration frequencies to loosen and remove dirt from such vehicles. The invention also relates to shaking vehicles for other purposes.

2. Background

Construction vehicles leaving construction sites carry a substantial amount of dirt, gravel, and other debris from the site out onto adjacent streets, roads, and highways. This dirt, gravel, and other debris is referred to as "track out." Track out has become an environmental and safety issue.

Devices exist for removing the gravel from tire treads by deforming the tire by running it over narrow rectilinear bars secured to a plate. These devices do not disclose removing dirt from the undercarriage or the body of the vehicle. In addition, they accumulate the expelled gravel and dirt in the dirt-removing device which subsequently requires frequent cleaning. The existing devices are also very heavy and require heavy equipment to move them.

SUMMARY OF THE INVENTION

The invention may include a series of appropriately spaced-apart bars to vibrate or shake a vehicle to free it of dirt, gravel and debris. The apparatus may have a track which provides bars with the appropriate spacing secured to a frame that is sized to be manipulated by hand by construction workers. A plurality of tracks may be flexibly connected end-to-end to form a row, and rows may be laid in a spaced-apart, mutually parallel configuration to form a device that will receive a vehicle. The device may be deployed onto a bed of aggregate that is sufficiently coarse and open-graded to allow the fallen dirt to sift or be washed into the bed of aggregate. The aggregate may also assist in holding the shaker in place and may serve as a ramp at the ends of each row. In an appropriate application, the frames may be unnecessary, and the bars may be fixed in position without the frames.

The track may be of a width to accommodate a full width of a four or more wheeled vehicle. In a simple form, the track may be an apparatus for removing track-out from a moving vehicle. The apparatus may include a frame adapted to be placed on the ground at any desired location. The frame may include a plurality of cross bars set in a spaced-apart relationship to each other, whereby a vehicle having its wheels traveling over the crossbars at a predetermined speed will move from one crossbar to an adjacent crossbar causing the vehicle to vibrate. The spacing between at least some of the adjacent crossbars may be between four inches and fifty inches. In some applications, spacing of five inches or more from center to center of the crossbars may be used. In other applications, the spacing between the crossbars from center to center may be between nine inches and twenty inches. The spacing of the crossbars may be uniform or non-uniform. A height of at least some of the crossbars may be different from a height of others of the crossbars.

The frame may be formed of the crossbars and additional structural members. For example, each frame may include a plurality of spaced-apart members transverse to at least one crossbar. The apparatus may include aggregate dispersed beneath the frame. The aggregate may be of sizes and shapes that form channels into the aggregate to allow dirt shaken from the vehicle passing over the frame to pass into the channels. The aggregate may be arranged to provide at least one ramp to at least one end of the frame. It is to be understood that the apparatus may include at least a portion of an exit path of a construction site, and the frame of the apparatus may be aligned along the exit path to orient the crossbars for shaking off track-out in accordance with the present invention.

In another simple form, the present invention may include a method for removing track-out from a vehicle. The method may include aligning at least one frame along an exit path of a construction site. The term "construction site" as used herein may refer to any of a variety of geographical areas used for a variety of purposes including, but not limited to, quarries, rock crushing operations, concrete batch plants, sand and gravel operations, and infrastructure or land development. The frame may have a plurality of substantially rigid crossbars secured within the frame in a spaced-apart relationship. The method may include receiving a moving vehicle onto the at least one frame at a first end of the frame and allowing the moving vehicle off of the frame at the second end of the frame. The method may also include vibrating the vehicle by moving the vehicle over the crossbars, and/or shaking the vehicle in one of a hopping-up-and-down, a teetering-back-and-forth, and a teetering-side-to-side manner by moving the vehicle over the crossbars. In this way, the vehicle may enter the construction site, pick up debris in the construction site during normal driving operation, and exit the construction site by passing over the at least one frame in order to vibrate the vehicle and/or shake off the debris before exiting the construction site.

The method may further include the step of dispersing below the frame aggregate selected to be of a size and shape to form spaces between the pieces of the aggregate. The method may include forming channels by providing the plurality of spaces. The method may also include the step of allowing the dirt that falls from the vehicle to move through the channels into the aggregate. The method may include the step of at least partially burying the frame in the aggregate. In another simple form the method may include supporting the crossbars on the aggregate. In any case, the method may include spacing at least some adjacent crossbars of the plurality of crossbars from each other in a range from approximately four inches to approximately fifty inches.

In another simple form, the present invention may include a construction site or at least a portion thereof. The construction site may include a construction site vehicle shaker. The construction site vehicle shaker may include a first end forming a path onto at least one track and a second end forming a path off of the at least one track. The at least one track may include a plurality of frame members extending generally along a line between the first and second ends. The construction site vehicle shaker may be adapted to vibrate a vehicle as it exits the construction site with the wheels of the vehicle traveling over the crossbars from the first end to the second end of the shaker.

The construction site may have a set of tracks including the at least one track. The set of tracks may include at least first and second tracks extending along the line in a side by side relation. The spacing of the crossbars on the first track may be different from a spacing of the crossbars on the second track so that at least some of the crossbars of the first track are offset along said line relative to the crossbars of the second track. Alternatively or additionally, at least some of the tracks of the set may be placed in end to end relation with each other for shaking a vehicle for a longer distance. Furthermore, the tracks may be wide enough to accommodate all the wheels of a vehicle having four or more wheels. Further additionally, the tracks may be wide enough to accommodate more than one or even multiple vehicles side by side. The construction site may also include a debris collection mechanism in an area beneath the at least one track. The debris collection mechanism may be configured to receive debris that is shaken from the vehicle.

The foregoing and other features and advantages of the invention will be apparent from the following more particular description of specific embodiments of the invention, as illustrated in the accompanying drawings.

DETAILED DESCRIPTION OF EMBODIMENTS OF THE INVENTION

Figure 1A:
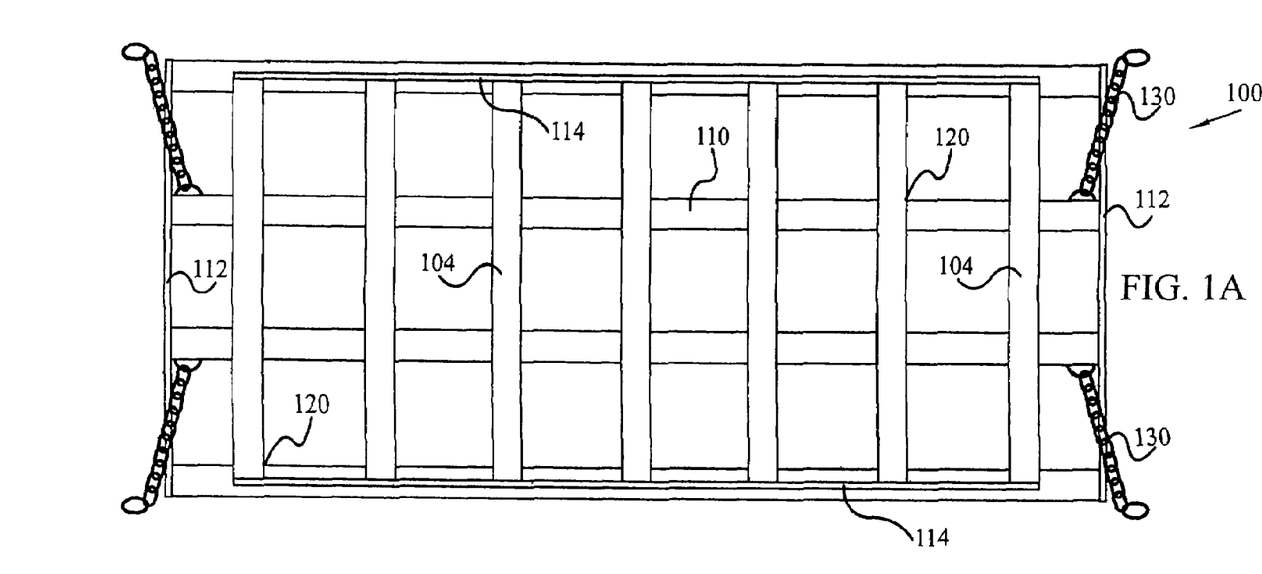
FIG. 1A is a top view of the invention.
Figure 1B:
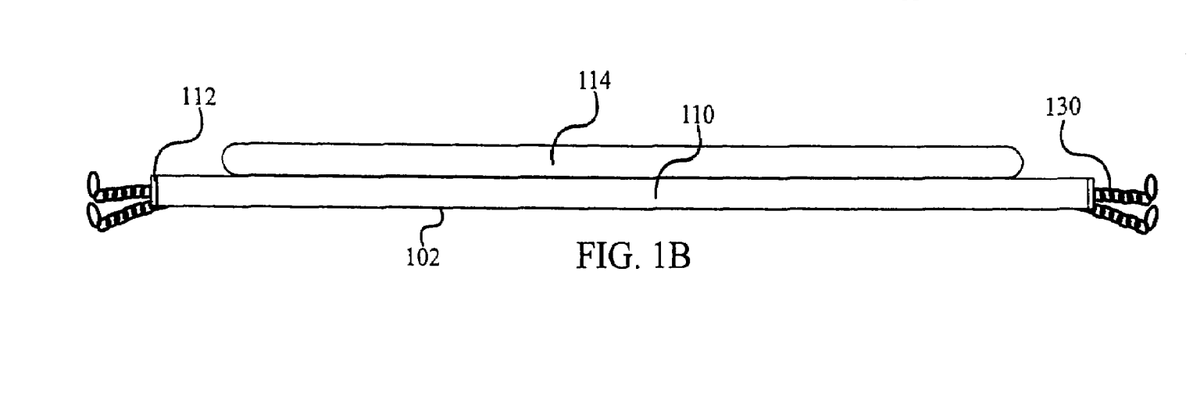
FIG. 1B is a side elevation view of the invention.
Figure 2A:
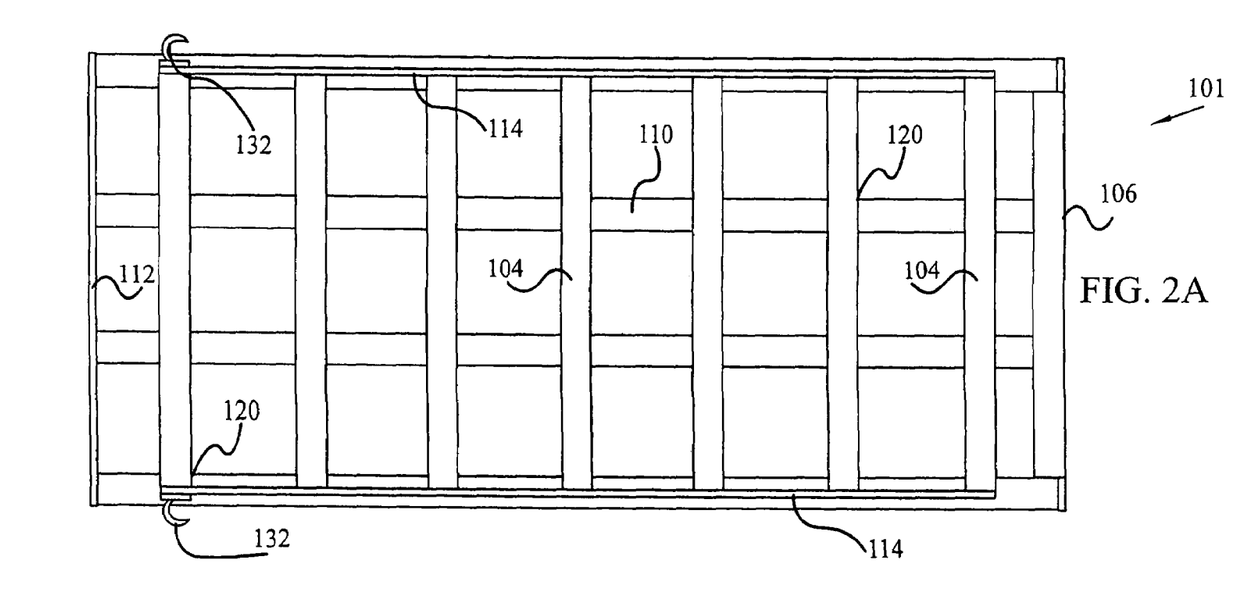
FIG. 2A is a top plan view of an alternate embodiment of the invention.

In an embodiment of the invention illustrated in FIGS. 1A and 1B, a track 100 for receiving moving vehicles comprises a frame 102 with a plurality of mutually parallel spaced-apart crossbars 104 attached to the top of the frame 102. In an embodiment, a track may be an open, ladder-like grid. In the illustrated embodiment, the frame 102 comprises four spaced-apart mutually parallel frame members 110 attached by their aligned ends abutted to and welded to rectangular end bars 112. The end bars 112 may abut similar end frame members 110 on other tracks 100 and 101 (FIG. 2) when the tracks 100 and 101 are assembled into rows. The frame members 110 are further connected by a plurality of crossbars 104 attached by welding to each point of contact 120 between the frame members 110 and the crossbars 104. In FIG. 1A, two such points of contact 120 are illustrated as examples. In the illustrated embodiment, the crossbars 104 and frame members 110 are pipes. The ends of the crossbars 104 are abutted to and welded to side bars 114 which are themselves welded along the top of the outer frame members 110. Chains 130 are attached to provide a flexible connection to other tracks 101 (FIG. 2) when forming a row. Also, in some embodiments, the chains 130 may be used with stakes to secure the track 100 in place. In the embodiment illustrated, the track of FIG. 1 may be the middle of three tracks 100, 101 in a row 320 (FIG. 3), wherein the chains 130 of the middle track 100 connect to the hooks 132 of the end tracks 101 (FIG. 2).

Those with skill in the art will appreciate that many types of bars 104, 110, 112, and 114 in addition to pipes may serve as frame members 110, crossbars 104, end bars 112, and side bars 114. The bars 104, 112, and 114 and frame members 110 require sufficient strength to withstand the forces delivered by the shaking vehicles while minimizing the weight of the track 100. In an embodiment, the bars 104, 112, and 114 and frame members 110 are substantially rigid. In another embodiment, bars 104, 112, and 114 and frame members 110 are slightly resilient. In an embodiment, schedule 80 steel pipe with an outside diameter of 2⅜" has served well for frame members 110 and crossbars 104 along with /1;4" by 2½" steel bar for end bars 112 and side bars 114. Such an embodiment weighs less than 300 pounds for a track 100, 101 eight feet long and forty-two inches wide. Consequently, the track 100, 101 may be safely lifted by a crew of four construction workers.

Those with skill in the art will also appreciate that welding is only one method of attaching the bars 104, 112, and 114 and frame members 110 together. In an embodiment, the track 100, 101 may be cast as one piece, eliminating the need for welding. In another embodiment, the bars 104, 112, and 114 and frame members 110 may be bolted together. Non-metal materials, such as ceramics, may be used and could require laser fusing or may be connected when fired. In yet another embodiment, the ends of the crossbars 104 need not abut side bars 114. Those skilled in the art will recognize that many materials and methods of joining those materials are possible.

The choice of spacing between crossbars 104 requires special attention. Different vehicles have wheels of different sizes, wheel bases of different lengths, and suspensions with different damping responses. A shaker can usually be optimized for only one set of vehicle features. However, the shaker of the present invention does not have to operate optimally to operate effectively. There are a number of factors to consider in deciding what spacing to use for effective shaking. Experience has shown that, for the embodiment described above using 2⅜" pipe for crossbars 104, a uniform spacing of 14" between the longitudinal axes of the crossbars 104 provides effective shaking for a large variety of construction vehicles. Of course, fourteen inches would not be an ideal crossbar 104 spacing for smaller vehicles where the wheels would not sufficiently span the distance between adjacent crossbars 104. Based on this experience, a spacing that is 1/(3.15) times the tire diameter for the vehicles of interest is effective. In an embodiment where vehicles of significantly different sizes (i.e., small pickup trucks and earth movers) are to be shaken, two or more separate shakers, each with crossbar 104 spacing sized for a representative tire diameter, may be used. Alternatively, as diagrammatically shown in FIGS. 4 and 5, a track may have non-uniform spacing between the crossbars 104 to accommodate a wider variety of wheel sizes, as will be explained in greater detail below.

Figure 3:
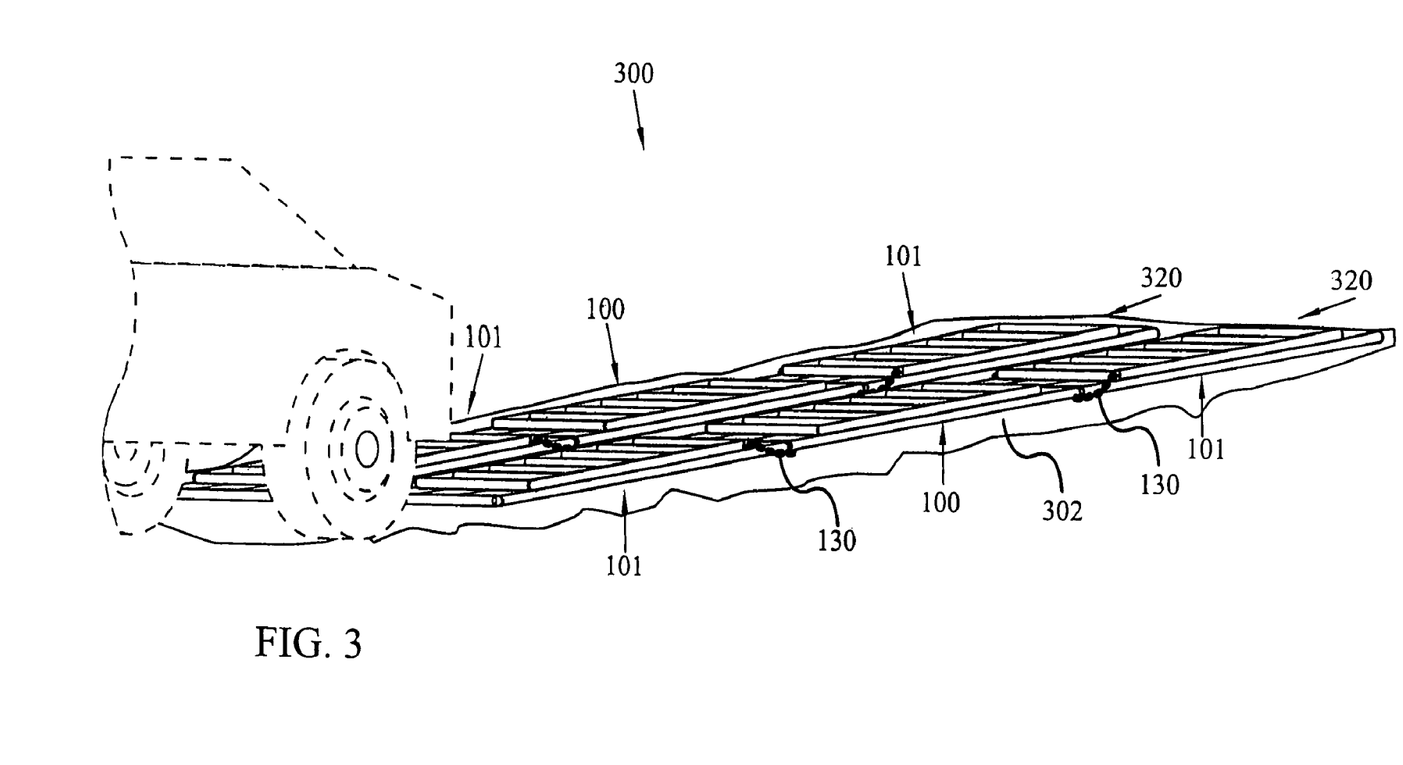
FIG. 3 is a perspective view of the invention in situ.
Figure 4:
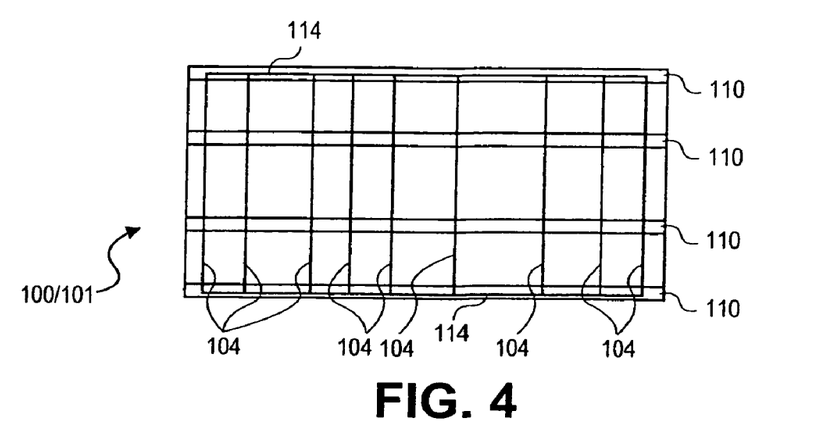
FIG. 4 is a diagrammatic top plan view of the tracks of FIGS. 1A and 2A in accordance with one aspect of the invention.
Figure 5:
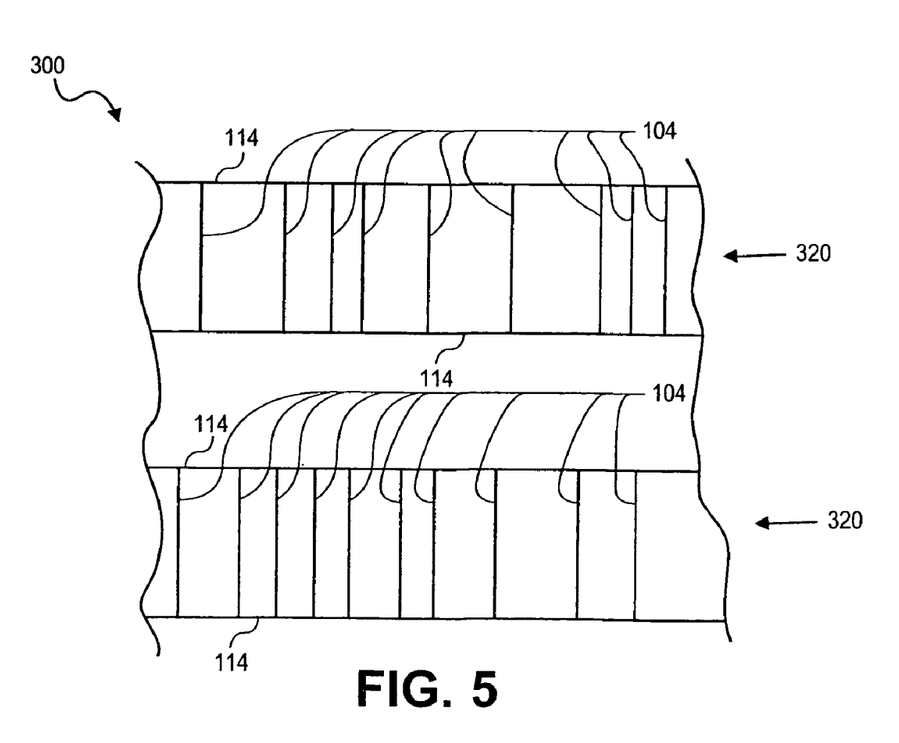
FIG. 5 is a diagrammatic top plan view of a shaker incorporating the tracks of FIG. 3.

In other embodiments, as shown in FIGS. 4 and 5, the crossbar 104 spacing is not uniform. Excitation of harmonic vibration modes in the vehicle body and undercarriage can contribute to shaking. Each vehicle has different vibration modes, and even those modes may change depending on how an individual vehicle is loaded. The suspension of a vehicle is essentially a spring-mass-damper system. The excitation of harmonic vibrations is driven by the frequency at which the wheels hit the crossbars 104. Thus, the excitation frequency is a function of vehicle speed and crossbar 104 spacing. By using non-uniform crossbar 104 spacing, a larger span of frequencies may be excited, increasing the chances of exciting a harmonic useful for shaking. Thus, the crossbar 104 spacing on a given track 100, 101 may not be uniform, or a row 320 (FIG. 3) of tracks 100, 101 may be formed wherein each track 100, 101 has a different uniform or non-uniform spacing. Also, the shaker may have rows where the crossbar 104 spacing in one row is different than the crossbar 104 spacing in the other, parallel row, as diagrammatically depicted in FIG. 5. Those skilled in the art will appreciate the many possible combinations of crossbar 104 spacings to excite a variety of frequencies.

In one application where the crossbar 104 spacing is uniform, the speed of the vehicle is varied to excite a range of frequencies. For example, a truck can accelerate or decelerate continuously while traveling the length of the shaker. Similarly, the truck could accelerate or decelerate while traveling the length of a shaker having non-uniform crossbar 104 spacing. In such an application, the driver learns from experience which speed produces the best shaking for his vehicle and the ground conditions.

In an embodiment, uniform crossbar 104 spacing is selected to be an integer divisor of the length of the wheel base of a vehicle with at least two axles. This crossbar 104 spacing may cause the wheels of the front axle and the wheels of the rear axle to impact the crossbars 104 at the same time. This will cause both ends of the vehicle to move up simultaneously and then to fall simultaneously after crossing the crossbar 104. The effect will be to cause the vehicle to shake by hopping up and down. In another embodiment, the crossbar 104 spacing is selected to not be an integer divisor of the length of the wheelbase of any vehicle. In this embodiment, the front and back ends will raise and fall at different times, thereby shaking with a teetering-back-and-forth effect. In a more complicated embodiment, the shaker has crossbars 104 spaced non-uniformly to create hopping-up-and-down shaking at least once for each of a plurality of vehicles with different wheel bases.

In other variations, the crossbars 104 in one row of the shaker are not co-linear with the crossbars 104 in other rows of the shaker, as diagrammatically depicted in FIG. 5. In an embodiment that uniformly excites hopping, non-co-linear crossbars will cause first one side and then the other side of the vehicle to hop, thereby creating additional side-to-side teetering-type shaking. When the crossbar 104 spacing is selected to cause back-and-forth teetering, non-co-linear crossbars 104 will provide both front-to-back and side-to-side shaking of the teetering-back-and-forth type.

In any of the embodiments disclosed herein, the crossbars may be removeably connected to frame members at any of a variety of spacings. This configuration may enable a user to select whether to implement uniform or non-uniform spacing in a single track and/or between tracks, whether the tracks are placed side by side or end to end. Likewise, this configuration may enable a user to select offsets between crossbars that engage right and left hand wheels. The variability in spacing may be adjustable to discrete positions such as may be provided by receivers in the frame members, or may be provided by infinitely adjustable slidable engagement along a length of the frame members. Advantageously, adjustability in the placement of the crossbars will enable adjustment of the type of shaking as well as shaking frequencies, for example. It is to be understood that an offset of up to approximately one inch may exist in uniformly spaced crossbars to account for a reasonable tolerancing during manufacturing. Offsets of greater than approximately one inch may cause teetering responses in side by side crossbars that are offset from each other, or may cause changes in shaking frequencies of vehicles passing along the path of the vehicle. Therefore, offsets or variations in spacing of greater than about an inch may be considered to provide offset or non-uniformly spaced crossbars.

Figure 2B:
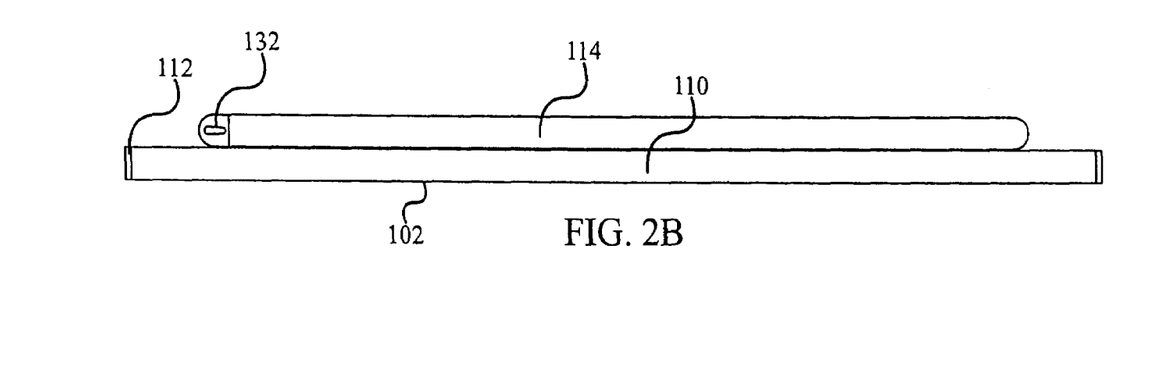
FIG. 2B is a side elevation view of the embodiment of FIG. 2A.

As illustrated in FIG. 2, an end bar 112 may be round in cross-section. In this embodiment, the end bar 112 is configured with the nearest crossbar 106 and the frame 102 to form a ramp. Note that crossbar 106 may be mechanically the same as crossbars 104, but is separately identified for convenience. Forming a ramp with the nearest crossbar and the frame may be advantageous in situations where ramps of aggregate 302 (FIG. 3) are not appropriate or not available. The ramp may also reduce the horizontal component of the force applied by the moving vehicle to the track 101.

In an embodiment illustrated in FIG. 3, the shaker 300 may be deployed on aggregate 302. A plurality of tracks 100, 101 may be laid end-to-end in rows 320 or a single track may be used. The rows 320 are deployed spaced apart and mutually parallel to form a shaker 300. The aggregate 302 may serve multiple purposes. For example, where the aggregate 302 is an open-graded aggregate 302, a plurality of channels are created through which fallen dirt can pass. Open-graded aggregate 302 has a gap in the grade-sizes of material it contains, thereby creating unfilled spaces between the stones. The open-graded aggregate 302 may be a single-grade aggregate 302. In operation, the fallen dirt is sifted downward by the vibration of the shaker 300 mechanically transmitted to the aggregate 302. If the dirt is mud, clay, or otherwise adhesive, the dirt that falls from the vehicle onto the open-graded aggregate 302 may be washed downward by a wheel washer, a mechanical wheel washing device, or a construction worker using a water hose. Aggregate 302 may be used to secure the shaker 300 in place by being graded against the side bars 114 and the frame members 110. The aggregate 302 may also be graded against the end bars 112 of the tracks 100 at the ends of each row 310 to form ramps up to the level of the crossbars 104 of the shaker 300. In the embodiment above using 2⅜" pipe, experience has shown that a single-graded 1.5" aggregate 302 is suitable for securing, sifting, and ramping functions. In another embodiment, the frame 102 is buried in aggregate 302 and the crossbars 104 and 106 are supported by the aggregate.

Alternatively, the tracks 100 of the shaker 300 may be secured in place with chains 130 connected to stakes driven into the ground. Of course, the tracks 100 of the shaker 300 could be secured in place with chains 130 connected to immovable objects. Further alternatively, the tracks and/or the crossbars could be secured directly or indirectly to immovable objects. For example, the chains, stakes, tracks, and/or crossbars may be cast in concrete.

An embodiment of the shaker 300 may be used for settling loads of gravel in a truck loaded with gravel. Typically, loads of gravel are settled by the motion of the truck on the road. This can lead to shifted loads and spillage, particularly from a loose load reacting to a sharp turn. By shaking the load at the gravel pit and before moving the truck onto public roads, the load is packed tighter and shifting and spillage may be reduced. Those skilled in the art of trucking will appreciate other loads that can benefit from settling before transit.

The foregoing description has described selected embodiments of a shaker 300 for shaking vehicles.

Figures 6A, 6B, 6C:
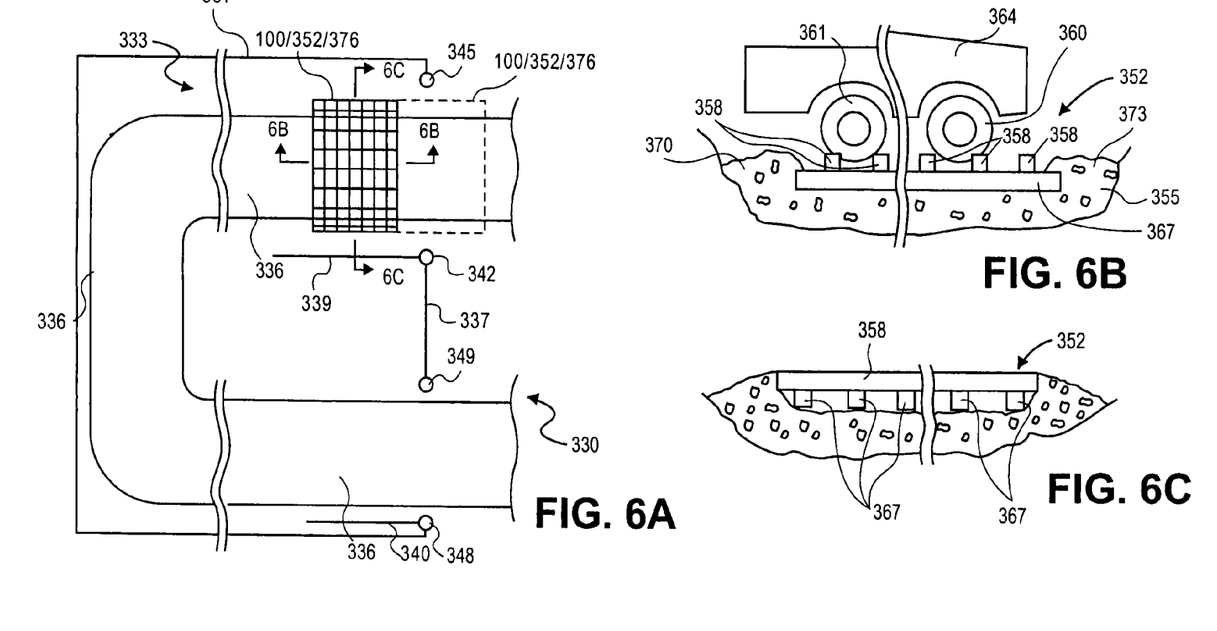
FIG. 6A is a diagrammatic top plan view of a construction site incorporating a shaker device in accordance with the present invention.
FIG. 6B is a sectional view taken along lines 6B—6B of FIG. 6A.
FIG. 6C is a sectional view taken along lines 6C—6C of FIG. 6A.

FIG. 6A shows a construction site 330 incorporating a shaking apparatus 333 in accordance with the present invention. It is to be understood that the shaking apparatus 333 could be any of a variety of apparatuses and may include the track or shaker 100/300 in any of its variations described above. For example, the shaking apparatus 333 may represent the track 100 described above, and the track 100 may be placed in a path 336 just before an exit demarcated by posts 342 and 345. Alternatively or additionally, the shaking apparatus 333 may include shakers incorporating tracks to be described below, including shakers without frames. Thus, as a vehicle may travel through the entrance demarcated by posts 348 and 349, through the construction site 330, along path 336, the vehicle will pick up debris as described above. However, before exiting, the vehicle may advantageously be required to pass over the shaking apparatus 333. In doing so, the debris will be shaken from the vehicle and remain in the construction site instead of being carried onto public roads, for example.

It is to be understood that the entrance and the exit may be at the same location of the construction site so that the path 336 may form a closed loop. In this case, vehicles could be required to drive over the shaking apparatus 333 both when entering and exiting the construction site. Requiring the vehicles to enter and exit at particular location of the construction site may be accomplished by fencing 337 or other barriers that may form a boundary of all or part of the construction site. One or more gates 339, 340 may be provided in the fence to securely open or close one or more entrances and/or exits. In most states there are laws that require construction sites to have fences or barriers that will prevent children and other trespassers from entering the site. Thus, the fences or barriers that may require ingress and egress at selected locations of the construction site may already be provided. Thus, all that may be needed is the selective placement of the tracks that form the shaking apparatuses of the present invention. That is, the tracks may be placed so that no vehicle may exit and/or enter without passing over the tracks and shaking the vehicle. For example, the tracks 100, 352, or 376 may be placed between the posts 342 and 345 as indicated by the track dashed outline of a track 100, 352, 376, may be placed very close as indicated by the track 100, 352, 376 shown in solid lines, or a plurality of tracks may be placed in both positions in an end to end relation.

FIG. 6B shows a shaker in the form of a track 352 that may be supported on aggregate 355. The track 352 may include cross bars 358 for engagement by the tires 360, 361 of a vehicle 364. The cross bars 358 may be supported in a generally transverse relation on two or more frame members 367. In the illustrated embodiments, the crossbars are shown generally parallel to the frame members. However, other non-perpendicular orientations may be implemented as well. Additionally it is to be understood that the track may be provided by the crossbars 358 supported directly on the ground or a selected aggregate 355. In any case, the crossbars may be oriented to engage the tires 360 and 361 in a successive pattern as the vehicle traverses the track so that the tires are moved up and down and the vehicle is shaken.

FIG. 6C is a sectional view taken along lines 6C—6C showing that a plurality of frame members 367 may support the crossbars 358. The crossbars 358 may be welded or otherwise fixed to the frame members 367. Alternatively, the frame members may be replaced by a single substrate such as a sheet of steel or any other foundation including wood, concrete, or earth. Advantageously, plural spaced frame members 367 may allow debris to fall therebetween and enter the aggregate 355 as has been described above. As shown in FIGS. 6B and 6C, the aggregate 355 may be piled to form entry and exit ramps 370, 373 and may even partially cover the track 352. Alternatively, the track may be buried in a selected aggregate 355 or in the ground so that the vehicle may drive onto the track without going up a ramp.

Figure 7:
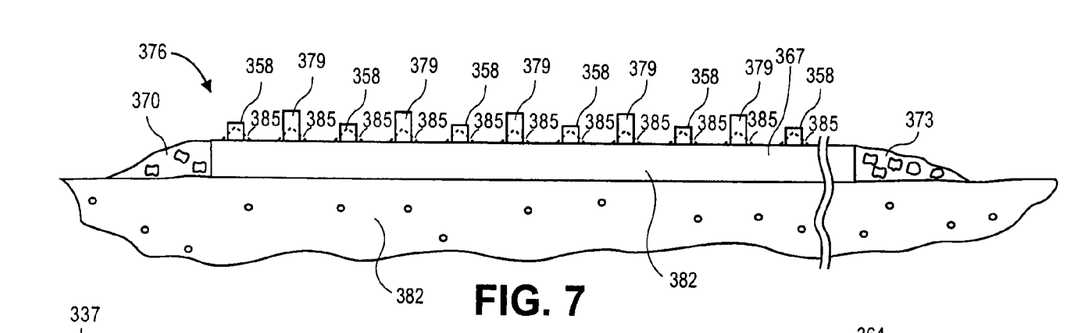
FIG. 7 is a view similar to FIG. 6B with structural variations in accordance with one embodiment of the present invention.

FIG. 7 shows an alternative embodiment of a track 376, having crossbars 358 and tall crossbars 379 supported on one or more frame members 382 or other foundation. The tall crossbars 379 may have a variety of heights in a given track 376. The tall crossbars 379 may be alternated with the crossbars 358. Alternatively or additionally, the crossbars 358 and tall crossbars 379 may be placed randomly or in other patterns. As described above, the purpose of the crossbars 358 and 379 is to cause the vehicles driven over them to be shaken to remove the track-out debris. In some configurations, the tall crossbars 379 may cause the most shaking, while the crossbars 358 may predominantly act as strengthening members for the track 376. This may be especially so when the spacing between the crossbars 358 and the tall crossbars 379 becomes small. For example, when the spacing is from four to nine inches and the tall crossbars 379 are from two to four times as tall as the crossbars 358, regular sized construction vehicles may receive most of their shaking input from the tall crossbars 379. The spacing between the crossbars 358, 379 may be uniform or non-uniform to provide desired shaking characteristics as described above.

An alternative embodiment is shown in dashed lines in FIG. 7 in which crossbars 385 may be provided by angle iron, steel, or other structural elements having a ninety degree bend. These crossbars 385 may be supported on frame members or another foundation such as a steel plate as represented by element 382. The spacing between the crossbars 385 may be selectively provided in a similar manner to any of those described above, and similar advantageous results may be achieved. Additionally, the construction of a shaker device in the form of a track 376 utilizing off-the-shelf angle and sheet components may provide advantages of increased material availability, materials cost reduction, and lower labor costs.

As with all of the embodiments shown and described herein, the track 376 may be placed on an existing ground 382, or may be placed on a selected aggregate 355. Likewise, ramps 370 and 373 may be formed at ends of the tracks of any of the embodiments, as illustrated in FIG. 7. Alternatively or additionally, the tracks may be at least partially buried in existing ground or in aggregate as illustrated in FIGS. 6B and 6C. It is to be understood that the features shown and described with all of the embodiments herein may be implemented in any combination to provide shaking apparatuses and methods without departing from the spirit and scope of the invention.

While the invention has been particularly shown and described with reference to selected embodiments thereof, it will be readily understood by one of ordinary skill in the art that, as limited only by the appended claims, various changes in form and details may be made therein without departing from the spirit and scope of the invention. For example, while the crossbars and frame members are shown as rectangular and/or having flat surfaces, any of the structural members of the shaker apparatuses may be provided in any shape or configuration as long as they provide structures that will shake a vehicle as it passes over the frames.

I claim:

1. An apparatus for removing track-out from a moving vehicle, comprising:
   a frame, adapted to be placed on the ground, said frame comprising:
   a plurality of parallel frame members rigidly connected to each other at their ends by a plurality of end bars; and
   a plurality of cross bars connected to each other by side bars, the plurality of crossbars fixed to the frame members at least in part by the side bars disposed on top of the frame members in a spaced-apart relationship to each other, whereby the vehicle having its wheels traveling over the crossbars at a predetermined speed will move from one crossbar to an adjacent crossbar causing the vehicle to vibrate and wherein the spacing between at least some of the adjacent crossbars is between four inches and fifty inches.

* * * * *

EX PARTE REEXAMINATION CERTIFICATE (9667th)
United States Patent
Lange (10) Number: US 7,059,799 C1
(45) Certificate Issued: *May 17, 2013

(54) METHOD AND DEVICE FOR REDUCING CONSTRUCTION SITE TRACK OUT

(75) Inventor: Jeffrey M. Lange, Tempe, AZ (US)

(73) Assignee: Trackout Industries, LLC, Tempe, AZ (US)

Reexamination Request:
No. 90/012,422, Aug. 27, 2012

Reexamination Certificate for:
Patent No.: 7,059,799
Issued: Jun. 13, 2006
Appl. No.: 11/286,073
Filed: Nov. 23, 2005

(*) Notice: This patent is subject to a terminal disclaimer.

Related U.S. Application Data

(63) Continuation of application No. 11/024,558, filed on Dec. 28, 2004, now Pat. No. 6,981,818, which is a continuation-in-part of application No. 10/211,664, filed on Aug. 2, 2002, now Pat. No. 6,881,006.

(51) Int. Cl.
*E01C 9/08* (2006.01)
*E01B 23/00* (2006.01)

(52) U.S. Cl.
USPC .............................. 404/15; 134/123; 238/14

(58) Field of Classification Search
None
See application file for complete search history.

(56) References Cited

To view the complete listing of prior art documents cited during the proceeding for Reexamination Control Number 90/012,422, please refer to the USPTO's public Patent Application Information Retrieval (PAIR) system under the Display References tab.

*Primary Examiner* — Patricia Engle (57) ABSTRACT

A method for shaking vehicles comprises driving them over a series of appropriately spaced-apart, mutually parallel bars to vigorously shake the wheels, undercarriage, and body to free them of dirt, gravel and debris. An apparatus may have bars with the appropriate spacing. A track may include a frame and the spaced-apart bars may form part of the frame. The track may be large enough to accommodate all the wheels of a vehicle at once. Alternatively, smaller tracks may be flexibly connected end-to-end to form a shaker that will receive right and left hand wheels of the vehicle on respective rows. The shaker may be deployed onto a bed of aggregate that is sufficiently coarse to allow the fallen dirt to sift or be washed through the bed of aggregate. The aggregate may also assist in holding the shaker in place and may provide ramps at the ends of the shaker.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

1. An apparatus for removing track-out from a moving vehicle, comprising:
  a frame, adapted to be placed on the ground, said frame comprising:
  a plurality of parallel frame members rigidly connected to each other at their ends by a plurality of end bars; and
  a plurality of cross bars connected to each other by side bars, the plurality of crossbars fixed to the frame members at least in part by the side bars disposed on top of the frame members in a spaced-apart relationship to each other, whereby the vehicle having its wheels traveling over the crossbars at a predetermined speed will move from one crossbar to an adjacent crossbar causing the vehicle to vibrate and wherein the spacing between at least some of the adjacent crossbars is between four inches and fifty inches *and further wherein the spacing of the crossbars is non-uniform.*

\* \* \* \* \*